United States Patent
Tsujimoto et al.

(10) Patent No.: US 10,598,253 B2
(45) Date of Patent: Mar. 24, 2020

(54) GEAR TRANSMISSION DEVICE

(71) Applicant: AISIN SEIKI KABUSHIKI KAISHA, Kariya-shi (JP)

(72) Inventors: Katsuhiro Tsujimoto, Anjo (JP); Shinya Yamaguchi, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 125 days.

(21) Appl. No.: 15/753,798

(22) PCT Filed: Jul. 12, 2016

(86) PCT No.: PCT/JP2016/070534
§ 371 (c)(1),
(2) Date: Feb. 20, 2018

(87) PCT Pub. No.: WO2017/051591
PCT Pub. Date: Mar. 30, 2017

(65) Prior Publication Data
US 2018/0238422 A1     Aug. 23, 2018

(30) Foreign Application Priority Data
Sep. 24, 2015 (JP) .................................. 2015-187232

(51) Int. Cl.
*F16H 1/16* (2006.01)
*F16H 55/22* (2006.01)
*F16H 1/12* (2006.01)
*F16H 55/08* (2006.01)

(52) U.S. Cl.
CPC ................ *F16H 1/16* (2013.01); *F16H 1/12* (2013.01); *F16H 55/22* (2013.01); *F16H 55/08* (2013.01)

(58) Field of Classification Search
CPC ..... F16H 1/12; F16H 1/125; F16H 1/16; F16H 55/08; F16H 55/22
See application file for complete search history.

(56) References Cited

U.S. PATENT DOCUMENTS

| 2,896,467 A | * | 7/1959 | Saari | ........................ F16H 1/12 74/459.5 |
| 6,128,969 A | * | 10/2000 | Litvin | ..................... F16H 1/125 244/17.11 |
| 2013/0174807 A1 | | 7/2013 | Kado et al. | |

(Continued)

FOREIGN PATENT DOCUMENTS

| DE | 102017211803 A1 * | 1/2019 | ............... F16H 1/12 |
| EP | 3 104 040 A1 | 12/2016 | |
| JP | 6-10652 U | 2/1994 | |

(Continued)

OTHER PUBLICATIONS

Machine translation of JP 6-10652 U obtained on Aug. 20, 2019.*

(Continued)

*Primary Examiner* — Adam D Rogers
(74) *Attorney, Agent, or Firm* — Oblon, McClelland, Maier & Neustadt, L.L.P.

(57) ABSTRACT

A drive gear and a driven gear meshing therewith are provided. The driven gear has a plurality of areas that provide driving loads variable with a rotational angle. Tooth widths of tooth portions included in the plurality of areas are set different from each other.

5 Claims, 5 Drawing Sheets

(56) References Cited

U.S. PATENT DOCUMENTS

2018/0238421 A1* 8/2018 Yamaguchi ............... F16H 1/16

FOREIGN PATENT DOCUMENTS

| JP | 10186480 A * | 7/1998 | ............ G03B 13/12 |
|---|---|---|---|
| JP | 2013-143808 A | 7/2013 | |
| JP | 2014-169745 A | 9/2014 | |
| JP | 2015-68394 A | 4/2015 | |
| JP | 2015-148258 A | 8/2015 | |
| WO | WO-2016013437 A1 * | 1/2016 | ............... F16H 1/12 |

OTHER PUBLICATIONS

Machine translation of JP 2014-169745 A obtained on Aug. 20, 2019.*
Notification of Transmittal of Translation of the International Preliminary Report on Patentability and Written Opinion dated Apr. 5, 2018 in PCT/JP2016/070534 with English translation.
International Search Report dated Aug. 9, 2016 in PCT/JP2016/070534 filed Jul. 12, 2016.

* cited by examiner

GEAR TRANSMISSION DEVICE

TECHNICAL FIELD

This invention relates to a gear transmission device configured to transmit rotation of an input-side gear to a driven gear.

BACKGROUND ART

As a gear transmission device configured as above, Patent Document 1 discloses a technique having a non-uniform rotation face gear and a pinion gear that meshes with this face gear. According to the above technique, the pinion gear is driven by an electric motor and the non-uniform rotation face gear is operably coupled with a steering mechanism of a steering system.

The steering system disclosed in this Patent Document 1 is configured such that a pressure angle formed between the non-uniform rotation face gear and the pinion gear is smaller in a region where a large torque is required than a region where a small torque is effective. Further, with the non-uniform rotation face gear, there is provided an arrangement that by varying a distance from the center of the gear to a region where a tooth face is formed, a steering gear characteristics is realized.

Patent Document 2 discloses a technique according to which a clutch device is operated via an input gear driven by an electric motor and a face gear meshing therewith. The face gear has a fan-like shape and teeth portions formed only at a region thereof corresponding to the arc of the fan-shape.

In this Patent Document 2, as one end of a rod for operating the clutch device is supported to the face gear, there is realized engagement/disengagement of the clutch device in association with a pivotal movement of the face gear.

CITATION LIST

Patent Literature

Patent Document 1: Japanese Unexamined Patent Application Publication No. 2014-169745
Patent Document 2: Japanese Unexamined Patent Application Publication No. 2015-148258

SUMMARY OF INVENTION

Technical Problem

In a gear transmission device configured such that an output-side gear is rotated within an angular range less than 360 degrees in response to rotation of an input-side gear, when load varies in association with a change in the rotational angle of the output-side gear, the surface pressure of gear increases with increase of the load, so that frictional loss will be invited. Further, in the above arrangement wherein the surface pressure of gear increases with increase of the load, friction will increase to result in increase in an operational resistance and will also tend to invite frictional wear of the gear as well as heat generation, disadvantageously.

In the case of the arrangement of e.g. Patent Document 2 wherein in the case that an electric motor drives an input gear so as to rotate a face gear, respective tooth surfaces of the input gear and the face gear are designed so that the surface pressure therebetween will not exceed a predetermined value even when the load reaches its maximal value. Further, although the arrangement of reducing the pressure angle as provided in Patent Document 1 improves efficiency, it is difficult to realize this arrangement as it is difficult to manufacture and it invites cost increase.

Notwithstanding the above, it is still desired that the gear transmission device should be formed compact. To this end, if all tooth portions are designed to withstand the maximum load, this will result in unnecessary increase in the size of certain tooth portions not exposed to a large load originally, thus providing restraint on the desired compactization as well as inviting undesirable weight increase.

For the reasons set forth above, there is a need to configure a gear transmission device having a drive gear and a driven gear meshing therewith compact and smoothly operable.

Solution to Problem

According to a characterizing feature of the present invention, a gear transmission device comprises:
a drive gear;
a driven gear meshing with the drive gear and rotatable for an angular range less than 360 degrees, the driven gear having a plurality of areas that provide driving loads variable with a rotational angle; and
the driven gear having tooth portions some of which are included in the plurality of areas, the tooth portions included in the plurality of areas being provided with tooth widths set different from each other.

With the above arrangement, when the driving load increases in association with rotation of the driven gear, of the tooth portions belonging in the plurality of areas that provide variable driving loads, a tooth portion having a larger tooth width will be caused to mesh with a tooth portion of the drive gear, so that increase of contact area between the tooth faces is made possible also. As a result, increase of rise in the surface pressure between the tooth faces can be suppressed even under a high load, thus achieving improvement in durability as well as suppression of frictional loss. Conversely, when the load applied to the driven gear decreases, of the tooth portions in the plurality of areas that provide variable driving loads, a tooth portion having a smaller tooth width will be caused to mesh with the tooth portion of the drive gear, so that meshing resistance can be reduced advantageously.

In sum, in a situation of high load application, excessive increase in the energy consumption of the actuator can be avoided. Whereas, in a situation of low load application, starting torque of the actuator for rotatably driving the drive gear can be reduced, thus improving its start-up characteristics also.

Consequently, it has become possible to configure a gear transmission device having a drive gear and a driven gear meshing therewith compact and smoothly operable.

According to a further characterizing feature of the present invention, a gear transmission device comprises:
a drive gear;
a driven gear meshing with the drive gear and rotatable for an angular range of 360 degrees, the driven gear having a plurality of areas that provide driving loads variable with a rotational angle; and
the driven gear having tooth portions some of which are included in the plurality of areas, the tooth portions included in the plurality of areas being provided with tooth widths set different from each other.

With the above arrangement, when a target object that provides a driving load variable for 360 degree region about its axis is to be driven by the driven gear, at a rotational angle where a large load is applied, the drive gear will be caused to mesh with a region of the driven gear having the larger tooth width. As a result, increase of rise in the surface pressure between the tooth faces can be suppressed even under a high load, thus achieving improvement in durability. Conversely, at a rotational angle where a small load is applied, the drive gear will be caused to mesh with a region of the driven gear having the smaller tooth width. As a result, meshing resistance can be reduced advantageously.

In sum, in a situation of high load application, excessive increase in the energy consumption of the actuator can be avoided. Whereas, in a situation of low load application, starting torque of the actuator for rotatably driving the drive gear can be reduced, thus improving its start-up characteristics also.

Consequently, it has become possible to configure a gear transmission device having a drive gear and a driven gear meshing therewith compact and smoothly operable.

According to a further preferred arrangement, the tooth widths of the tooth portions formed in the driven gear are set in direct proportion to the rotational angle of this driven gear.

In the case of one conceivable exemplary arrangement in which a spring-urged driving target is to be displaced against the urging force of its spring, when this displacement is to occur in the direction of increasing the urging force, the driving load increases in direct proportion to the amount of this displacement. For this reason, according to the above-described characterizing arrangement, in the case also when a target providing a load variable in direct proportion to the rotational angle about the axis is to be driven, smooth driving can be realized with maintaining the surface pressure between the respective tooth faces constant irrespectively of the value of the driving load.

According to a further preferred arrangement, an outer end portion of opposed ends in a tooth trace direction of each tooth portion of the driven gear is formed along a circumference centering about the axis of the driven gear.

With the above arrangement, setting of the tooth widths of the plurality of tooth portions of the driven gear is possible without entailing enlargement of the outside diameter of the driven gear, whereby further compactization is realized.

According to a further preferred arrangement, an inner end portion of opposed ends in a tooth trace direction of each tooth portion of the driven gear is formed along a circumference centering about the axis of the driven gear.

With the above arrangement, although the outside diameter of the driven gear is increased, not only the tooth width, but also the tooth thickness, of the tooth portions in such enlarged area can be increased, so that durability of the driven gear can be improved.

According to a further preferred arrangement, the drive gear is a pinion gear and the driven gear is a face gear.

With the device configured such that the drive gear is constituted of a pinion gear and the driven gear is constituted of a face gear, it is possible to form the device compact, while obtaining a large speed reduction ratio as well.

DESCRIPTION OF EMBODIMENTS

Figure 1:
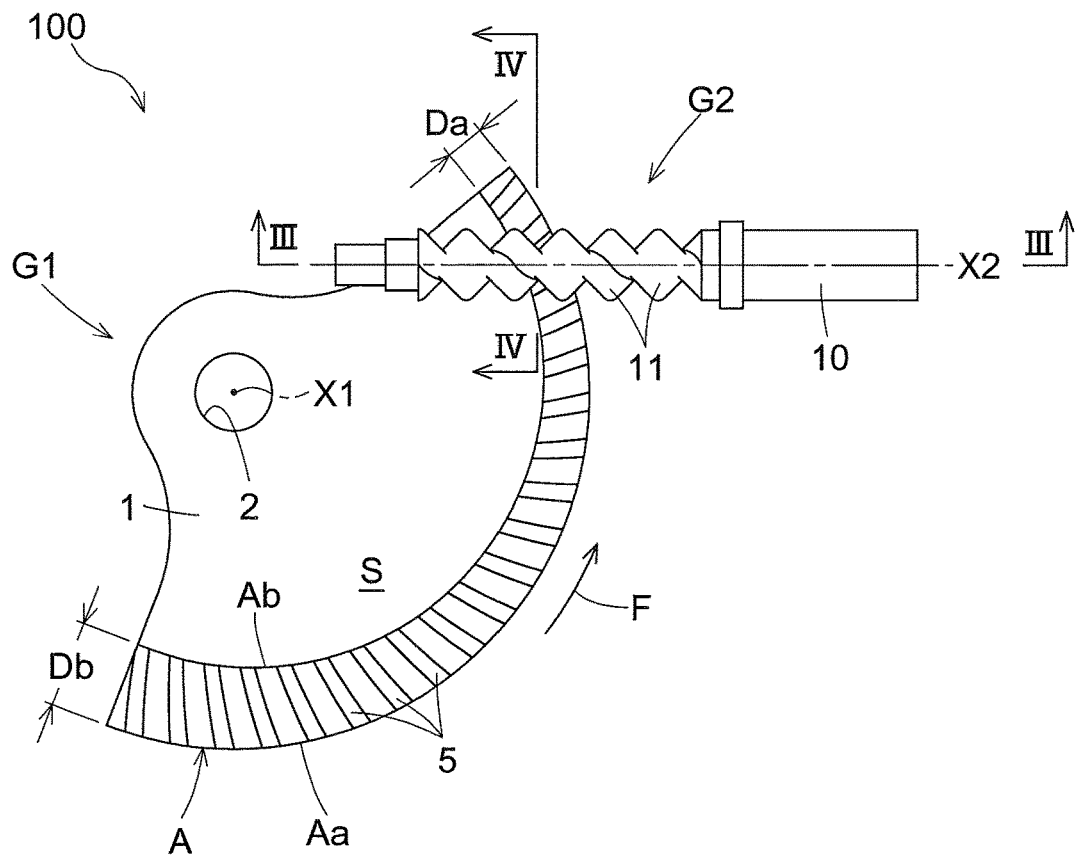
FIG. 1 is a plan view of a gear transmission device under a low load state.

Next, embodiments of the invention will be described with reference to the drawings.

[Basic Configuration of Gear Transmission Device]
Embodiment

As shown in FIGS. 1-7, a gear transmission device is constituted of a mutually meshing arrangement of a fan-shaped face gear G1 (an example of a "driven gear") rotatable about a first axis X1 for a predetermined angular range less than 360 degrees and a pinion gear G2 (an example of a "drive gear") rotatable about a second axis X2 formed at a position different from the first axis X1.

This gear transmission device 100 is to be incorporated in a transmission system configured to drive the face gear G1 at a reduced speed by rotatably driving the pinion gear G2 with an actuator such as an electric motor.

In the face gear G1, a bearing hole 2 is formed at the center of a fan-shaped gear body 1 centering about the first axis X1 and a plurality of tooth portions 5 are formed in a tooth portion forming region A corresponding to the arc of the fan of the gear body 1.

In this gear transmission device 100, as a support shaft is inserted through the bearing hole 2, the face gear G1 is supported to be pivotable about the first axis X1. Incidentally and alternatively, an output shaft can be inserted through the bearing hole 2 to be fixedly connected to the gear body 1, so that a pivotal force can be taken off via this output shaft.

The face gear G1 is assumed to be made by casting work or pressing work. Alternatively, the plurality of tooth portions 5 may be formed by cutting of a material or by resin molding using a mold.

The pinion gear G2 is configured as a helical pinion gear comprised of a shaft 10 and two grooves of gear portion 11 (a tooth portion of the pinion gear G2) in the form of threads formed integrally therein, and the pinion gear G2 is supported to be rotatable about the second axis X2.

[Tooth Portions of Driven Gear]

In the fan-shaped gear body 1, an arc-shaped outer circumference portion (the region corresponding to the arc portion of the fan) is formed along the circumference centering about the first axis X1 and a tooth portion forming region A is formed along this outer circumference portion. In this tooth portion forming region A, there are formed a plurality of tooth portions 5 that protrude in the direction along the first axis X1.

Figure 5:
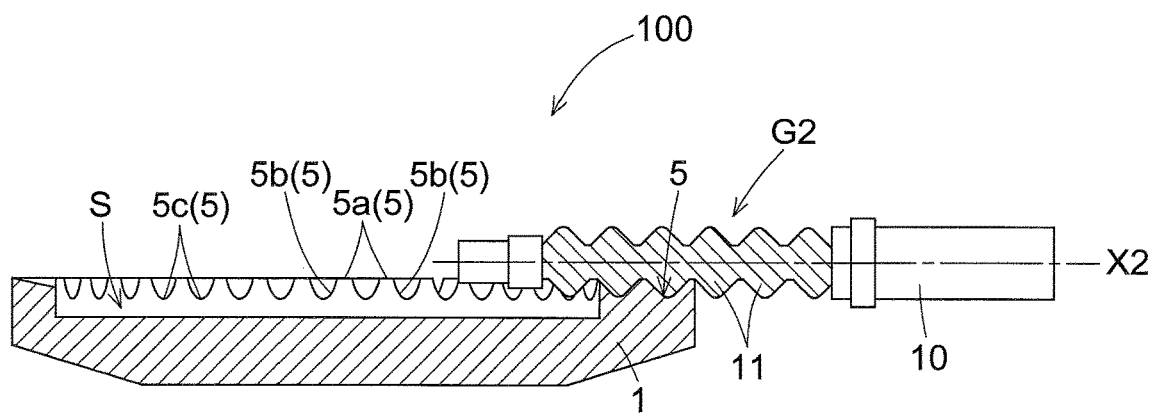
FIG. 5 is a section taken along a line V-V in FIG. 2.
Figure 6:
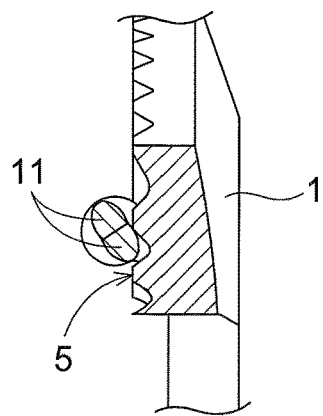
FIG. 6 is a section taken along a line VI-VI in FIG. 2.
Figure 7:
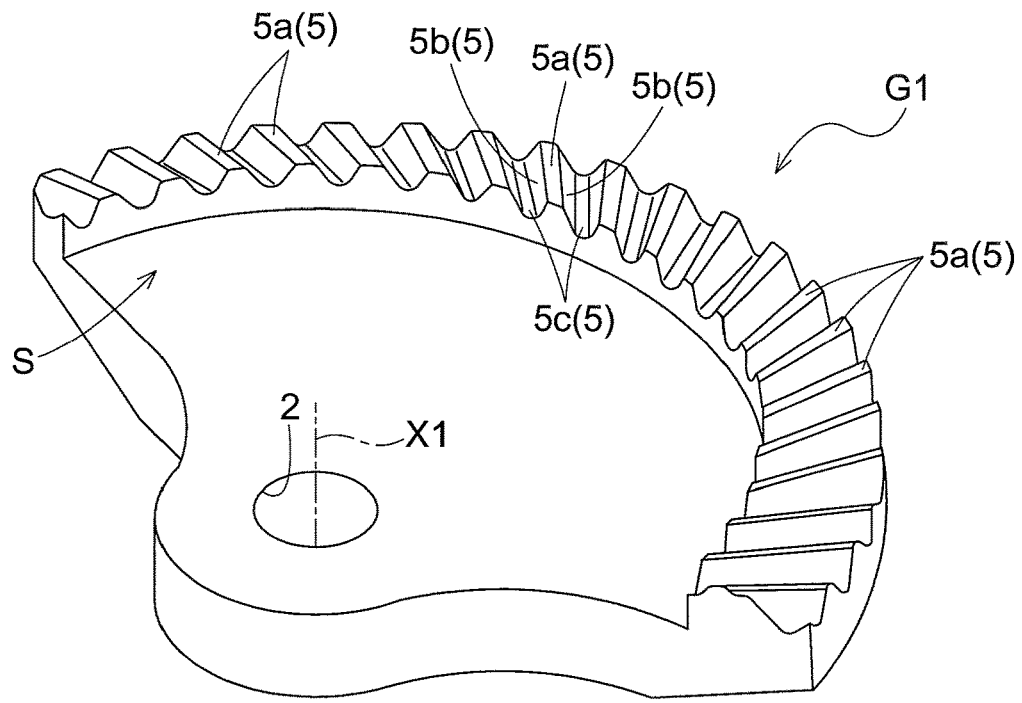
FIG. 7 is a perspective view of a driven gear.

In each one of the plurality of tooth portions 5, as shown in FIG. 5 and FIG. 7, a tooth top (addendum) 5a, a tooth face (tooth flank) 5b and a tooth bottom (dedendum) 5c are formed along a tooth trace curve (helix curve). Further, each tooth top 5a is disposed on a virtual plane oriented perpendicular to the first axis X1.

In the gear body 1, at an area close to the first axis X1 than the tooth portion forming region A, there is formed a receded space S which is further receded in the direction along the first axis X1 than the tooth bottom 5c of the tooth portion 5.

Forming of the receded space S described above serves to suppress mutual interference between a portion of a gear portion 11 of the pinion gear G2 which protrudes more inwards (in the direction of the first axis X1) than the tooth portion forming region A of the face gear G1 and a constituent member (basically the gear body 1) of the face gear G1. Incidentally, forming of the receded space S serves also to facilitate layout of a bearing which supports a portion (inner end portion) of the gear portion 11 of the pinion gear G2 which portion protrudes in the direction of the first axis X1.

Further, relative to a bottom face forming the receded space S in the gear body 1, protrusion amounts of the plurality of tooth portions 5 formed in the tooth portion forming region A are set equal to each other. In other words, each one of the plurality of tooth tops 5a and each one of the plurality of tooth bottoms 5c are formed respectively with an equal height.

The tooth portion forming region A is formed in such a manner as to be surrounded by an outer edge portion Aa extending along the outer circumferential edge of the face gear G1 and an inner edge portion Ab disposed more in the direction of the first axis X1 than the outer edge portion Aa. The outer edge portion Aa is disposed on the arc along the circumference centering about the first axis X1, whereas the inner edge portion Ab is formed as a curve not centering about the first axis X1. Specifically, of the opposed ends in the tooth trace direction of the tooth portion 5, the radially outer end is disposed on the arc centering about the first axis X1 and of the opposed ends in the tooth trace direction of the tooth portion 5, the radially inner end is disposed on the curve not centering about the first axis X1.

With the above-described shape setting of the tooth portion forming region A, the curve of the inner edge portion Ab is configured such that a distance Db between this inner edge portion Ab and the outer edge portion Aa at the other end in the circumferential direction is increased relative to a distance Da between the inner edge portion Ab and the outer edge portion Aa at one end in the circumferential direction. As a consequence of this arrangement, with progressive increase of the tooth width, the position of the inner end face (position of the inner edge portion Ab) facing the direction of the first axis X1 protrudes more toward the first axis X1.

Namely, the face gear G1 is to be included in a transmission line arranged such that the driving load varies according to rotation toward the arrow F. Then, the tooth widths of the tooth portions 5 are set different from each other, in correspondence with a plurality of areas that provide variable driving loads. In addition, an arrangement is provided such that in association with increase of the load, the tooth width by which the tooth portion 5 comes into contact with the gear portion 11 of the pinion gear G2 is increased.

For instance, let us consider a conceivable arrangement in which an operation target that provides a progressively increased spring urging force with increase of its pulling operation amount and the gear body 1 of the face gear G1 are operably coupled (interlocked) with each other via an operational rod or the like and when the face gear G1 is rotated in the direction of the arrow F, the operational rod is pulled against the spring urging force. In this case, the load increases in association with increase in the rotational amount of the face gear G1 in the direction of the arrow F.

Then, in order to be able to cope with the above-described conceivable situation, the shape of the tooth portion forming region A is configured such that the distance between the outer edge portion Aa and the inner edge portion Ab of the tooth portion forming region A is increased (the tooth width is increased) progressively toward the upstream side in the arrow F direction. The values of the distance Da and the distance Db will be determined based on an arrangement of the gear transmission mechanism employed and the magnitude of the loads.

[Mode of Transmission]

Here, let us consider a comparison arrangement of a gear transmission mechanism in which the tooth portion forming region A has a constant width (i.e. the distance Da and the distance Db are equal to each other). In this case, when the load increases with increase of the rotational amount of the face gear G1, the surface pressure between the tooth portion 5 of the face gear G1 and the gear portion 11 of the pinion gear rises and in association with this rise of the surface pressure, there will occur correspondingly increase in the meshing resistance as well as increase in the friction loss. This will lead not only to reduction in the transmission efficiency, but also to increase in the capacity of the electric motor or the like that drives the pinion gear G2.

Figure 2:
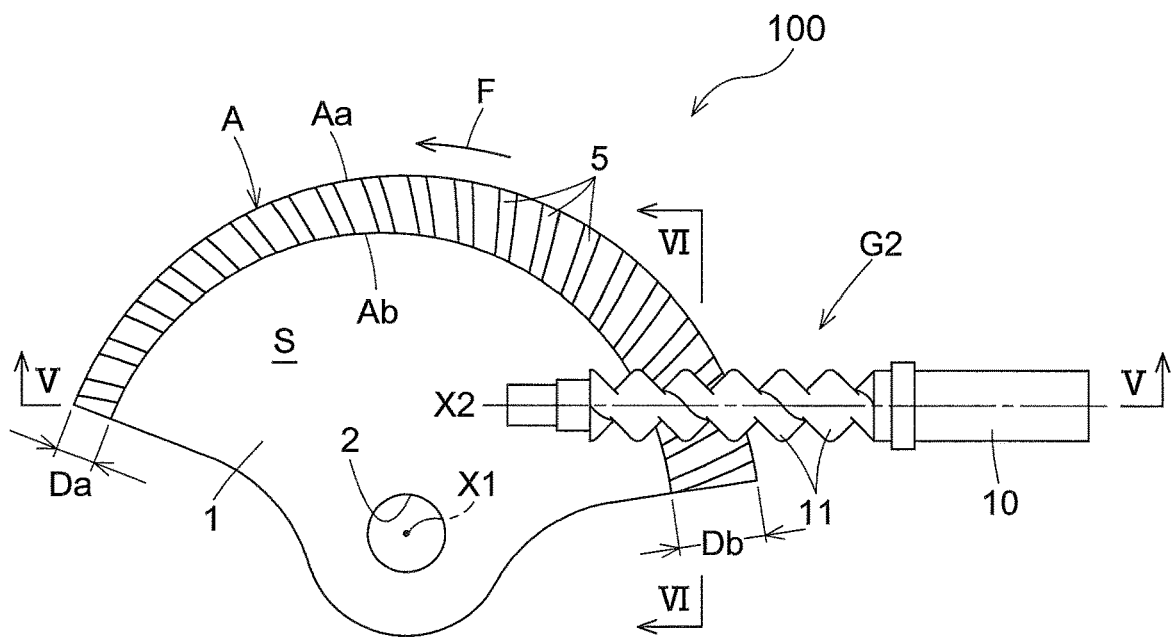
FIG. 2 is a plan view of the gear transmission device under a high load state.
Figure 3:
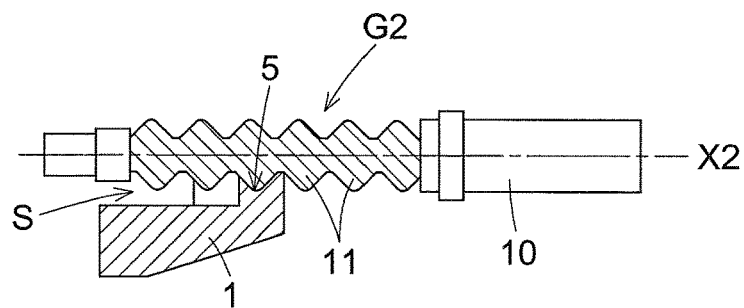
FIG. 3 is a section taken along a line III-III in FIG. 1.
Figure 4:
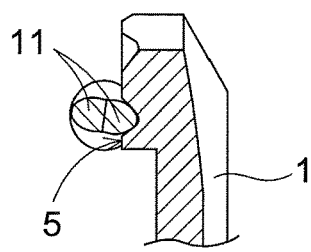
FIG. 4 is a section taken along a line IV-IV in FIG. 1.

On the other hand, in the case of the gear transmission device 100 with the distance Da and the distance Db being set as illustrated in FIG. 1 and FIG. 2, when driving of the face gear G1 is started in the direction of arrow F with driving of the pinion gear G2, at the initial stage of this driving, the tooth width of the tooth portion 5 of the face gear G1 which meshes with the gear portion 11 of the pinion gear G2 is small, so the meshing resistance too is small. Thus, the starting torque of the electric motor or the like for rotatably driving the pinion gear G2 is reduced, thus improving the start-up characteristics.

Subsequently, as the rotational amount of the face gear G1 increases in association with continued rotation of the pinion gear G2, the tooth width of the tooth portion 5 of the face gear G1 meshing with the gear portion 11 of the pinion gear G2 increases progressively. Thus, the contact area between the surfaces of the gear portion 11 and the tooth portion 5 is increased, thereby to suppress rise of the surface pressure. As a result, the durability is improved and friction loss is suppressed. In addition, frictional wear is suppressed and heat generation too is suppressed. Moreover, undesirable excessive rise in the electric power consumption of the electric motor or the like that rotatably drives the pinion gear G2 is suppressed as well.

Especially, with the above-described arrangement, since the arc-shaped outer circumference of the fan-shaped gear body 1 is formed to center about the first axis X1, disadvantageous enlargement of the face gear G1 can be suppressed.

It will be ideal to configure the shape of the curve of the inner edge portion Ab in order to obtain such a tooth width profile providing a constant surface pressure effective between the tooth portions 5 and the gear portion 11 by increasing the contact area between the tooth portions 5 of the face gear G1 and the gear portion 11 of the pinion gear G2 in direct proportion to an increase that may occur in the load applied to the face gear G1. Yet, it should be noted that the curve of the inner edge portion Ab need not be formed with strict accuracy. Rather, it can be a curve which forms a portion of an ellipse or a parabola, or can be formed by drawing an arc having a smaller radius than the radius of the outer edge portion Aa at an axial position different from the first axis X1.

[Exemplary Use of Gear Transmission Device]

Figure 8:
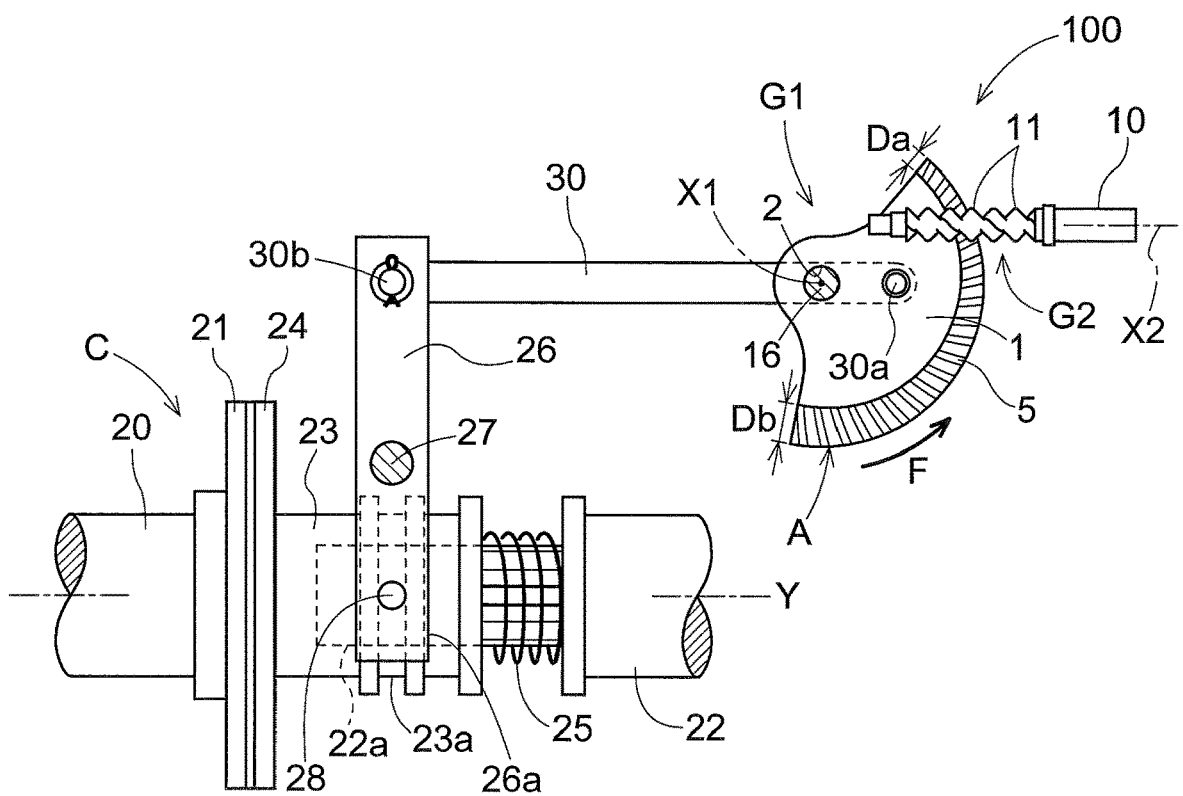
FIG. 8 is a side view showing a clutch mechanism and the transmission device under a transmitting state.
Figure 9:
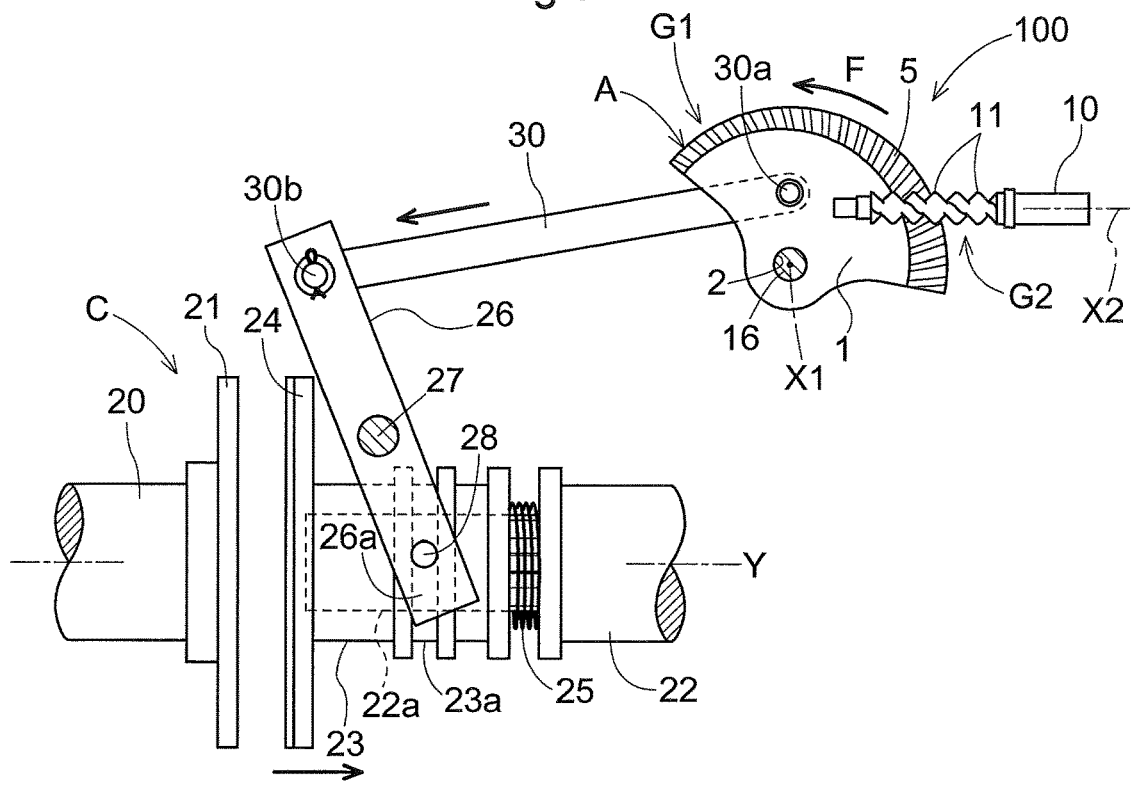
FIG. 9 is a side view showing the clutch mechanism and the transmission device under a non-transmitting state.

FIG. 8 and FIG. 9 show an arrangement of operating a clutch mechanism C via the gear transmission device 100 as an example of use providing the face gear G1 in a transmission system subjected to variable driving load.

In this exemplary use, the face gear G1 is rotatably supported to a frame of a vehicle, a machine, etc. via a gear support shaft 16. With meshing between the tooth portion 5 of the face gear G1 and the gear portion 11 of the pinion gear G2, a driving force of an unillustrated electric motor is transmitted to a shaft 10 of the pinion gear G2.

The clutch mechanism C is arranged such that a drive disc 21 rotatable in unison with a drive shaft 20 and a driven disc 24 mounted on a sleeve 23 rotatable in unison with an output shaft 22 are disposed coaxially with the transmission axis Y. In particular, in response to establishment of engagement between a splined portion formed in the output shaft 22 with the sleeve 23, the sleeve 23 can transmit torque to the output shaft 22 and is supported thereon to be movable along the transmission axis Y.

Between the output shaft 22 and the sleeve 23, there is provided a spring 25 serving to bring the driven disc 24 into pressed contact with the drive disc 21. With this arrangement, the clutch mechanism C is maintained under a transmitting state (engaged state) under the urging force of the spring 25 as illustrated in FIG. 8. Further, the clutch mechanism C will be set to a non-transmitting state (disengaged state) by detaching the driven disc 24 from the drive disc 21 against the urging force of the spring 25 as illustrated in FIG. 9.

An operational arm 26 for engaging/disengaging the clutch mechanism C is pivotally supported to the frame of the machine or the like via a support shaft 27. At an operational stroke end position of this operational arm 26, there are formed a pair of forked portions 26a disposed at positions to embrace the sleeve 23 therebetween. Engaging pins 28 are provided in opposed faces of the respective forked portion 26a. This pair of engaging pins 28 come into engagement with an engagement groove 23a defined in the outer circumference of the sleeve 23.

Further, the face gear G1 and the operational arm 26 are operably coupled (interlocked) with each other via an operational rod 30. This operational rod 30 has its opposed end portions bent, thereby to form an active end 30a at its one end and an operational end 30b at the other end. And, the active end 30a is engaged with the gear body 1 of the fan-shaped face gear G1, whereas the operational end 30b is engaged with the operational arm 26.

According to the above-described arrangement, when the clutch mechanism C is under the transmitting state as shown in FIG. 8, the gear portion 11 of the pinion gear G2 is meshed with an area having a small tooth width in the tooth portion forming region A of the face gear G1. Further, under this transmitting state, under the urging force of the spring 25, the driven disc 24 is placed in pressed-contact with the drive disc 21, so that a driving force of the drive shaft 20 is transmitted to the output shaft 22.

And, when the clutch mechanism C is to be operated into the non-transmitting state, the electric motor will drive the pinion gear G2 for rotating the face gear G1 in the direction of the arrow F. In association with this rotation, the rotational force of the face gear G1 is applied to the operational end of the operational arm 26 via the operational rod 30, whereby the operational arm 26 is pivoted about the support shaft 27. With this pivotal movement, the driven disc 24 is shifted along the transmission axis Y together with the sleeve 23 against the urging force of the spring 25, thus detaching this disc 24 from the drive disc 21. With this, transmission of the drive force is stopped.

With the above-described configuration, an arrangement is provided such that the tooth width by which the tooth portion 5 comes into contact with the gear portion 11 of the pinion gear G2 increases progressively in association with increase of load. Namely, the distance between the outer edge portion Aa and the inner edge portion Ab of the tooth portion forming region A is larger (increase of tooth width) on more upstream side in the arrow F direction. As a result, rise of the surface pressure between the tooth surfaces is suppressed to achieve improvement of durability, and suppressions of frictional loss, frictional wear and heat generation are achieved also.

Other Embodiments

The present invention can be configured alternatively, in addition to the foregoing embodiment (in the following, components having same functions as those of the foregoing embodiment will be denoted with same or like reference numerals/marks as those used in the foregoing embodiment).

Figure 10:
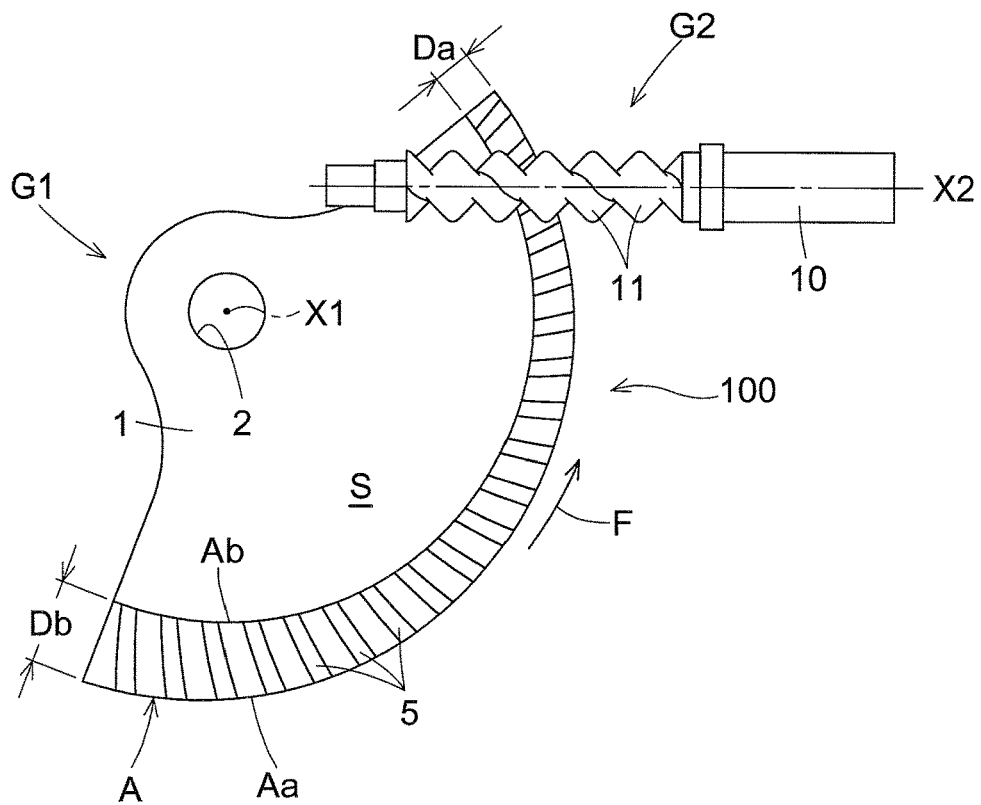
FIG. 10 is a plan view showing a gear transmission device according to a further embodiment (a)

(a) As shown in FIG. 10, the tooth portion forming region A is formed in a region delimited by an arc-shaped inner edge portion Ab on the inner circumference side and extending along a circumference centering about the first axis X and an outer edge portion Aa having a curve not centering about the first axis X1. Namely, an arrangement is provided in which the width of tooth meshing with the pinion gear G2 increases to the outer side as the face gear G1 is rotated in the direction of the arrow F. With this, of the opposed ends of the tooth portion 5 in the tooth trace direction, the inner end is disposed on the arc centering about the first axis X1 whereas, of the opposed ends of the tooth portion 5 in the tooth trace direction, the outer end is disposed on the curve not centering about the first axis X1.

With the above-described arrangement, the tooth thickness increases in the areas having increased tooth widths, so that the strength of the tool portions can enhanced and the durability of the device can be improved also.

(b) The tooth portion forming region A may be formed to be delimited by an outer edge portion Aa having a curve not centering about the first axis X1 as illustrated in the further embodiment (a) and an inner edge portion Ab formed as a curve not centering about the first axis X1 as illustrated in the embodiment.

(c) The tooth portion forming region A can comprise combination of a region having a predetermined tooth width and a region having a greater tooth width than the above, so that the tooth width may increase in a stepwise manner. Namely, in this case, the plurality of tooth portions 5 of the face gear G1 will comprise an arrangement of those having the predetermined tooth width and those having the different tooth width in series in the outer circumferential area of the face gear G1.

(d) The transmission device can comprise a face gear G1 having tooth portions formed as spur teeth in its outer circumference and a pinion gear G2 having tooth portions formed as spur teeth meshing with the tooth portions of the face gear G1. In this arrangement, the rotatable angle of the face gear G1 will be set less than 360 degrees and of the plurality of tooth portions of the face gear G1, those belonging in the areas subjected to high load will have increased tooth widths.

As a specific example of the above arrangement, like the foregoing embodiment, the driven gear G1 can be configured by forming tooth portions 5 in the form of spur gears in the arc portion of the face gear G1 supported to be pivotable about the first axis X1 and the drive gear G2 can be configured to mesh with these tooth portions 5. With this configuration, in a situation of high load application, no excessive energy consumption will occur in the actuator which rotatably drives the drive gear G2. Whereas, in a situation of low load application, the torque for starting up the actuator which rotatably drives the drive gear G2 can be reduced, thus improving the start-up characteristics as well.

Figure 11:
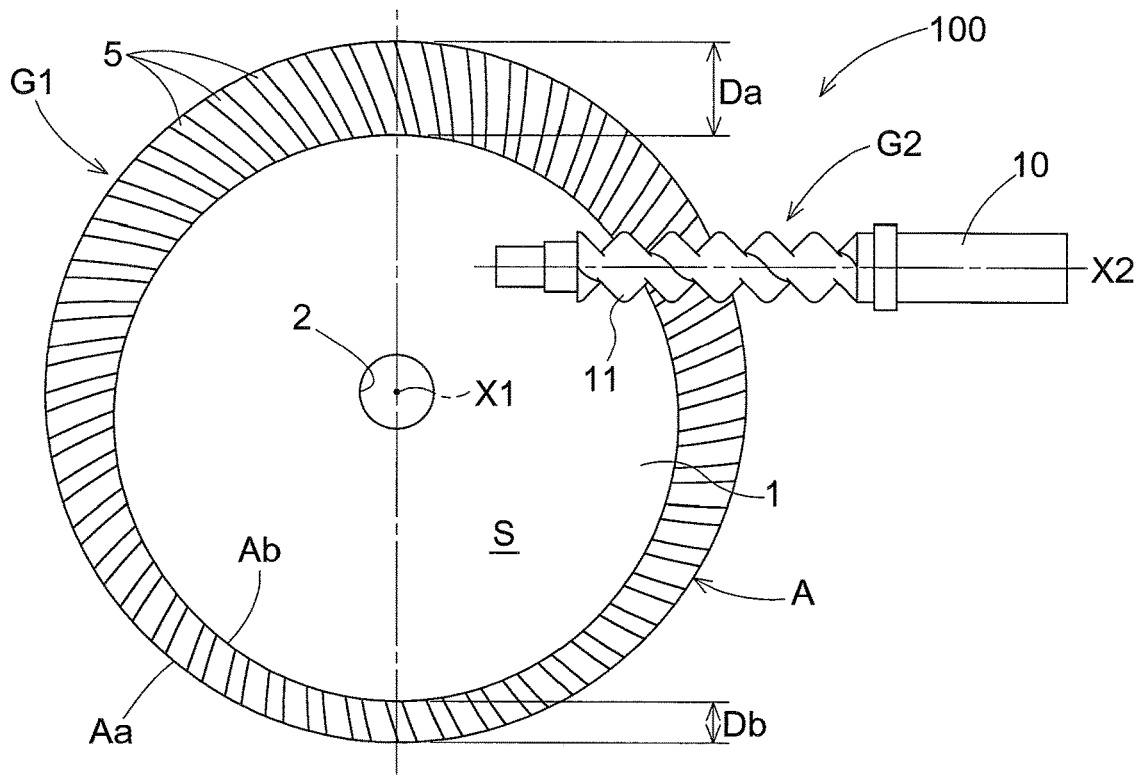
FIG. 11 is a plan view showing a gear transmission device according to a further embodiment (e)
Figure 12:
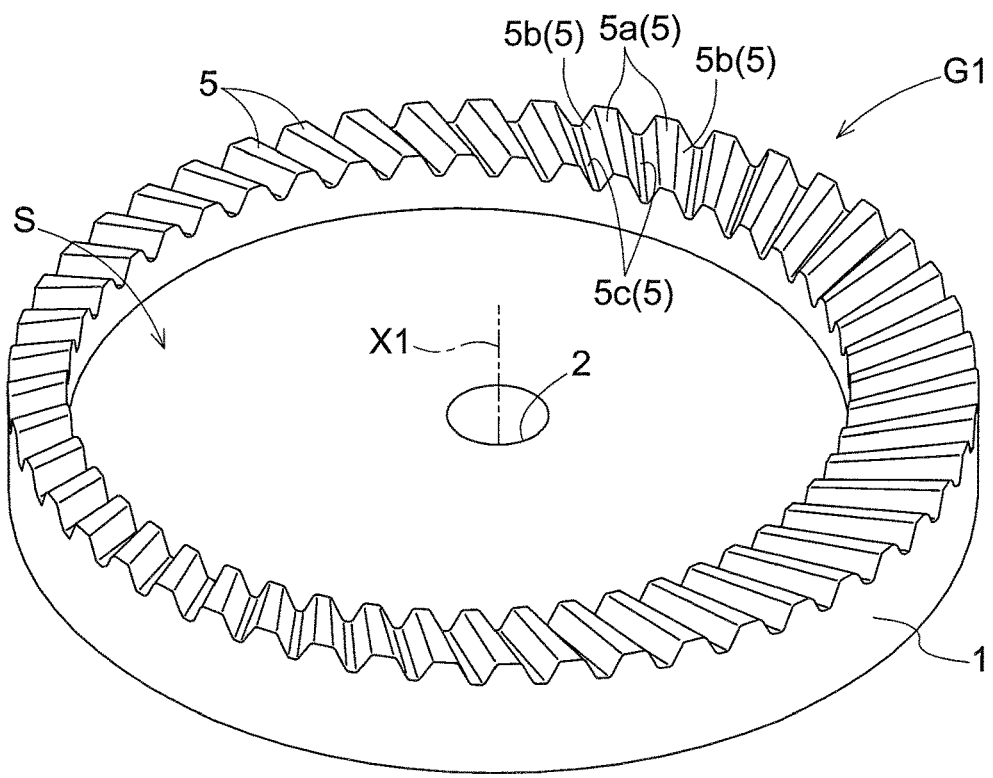
FIG. 12 is a perspective view showing a driven gear according to the further embodiment (e).

(e) As shown in FIG. 11 and FIG. 12, the face gear G1 as a driven gear is provided with tooth portions in 360 degree region centering about the first axis X1. In this arrangement, the outer edge portion Aa of the tooth portion forming region A is formed as a circle along the circumference centering about the first axis X1 and the inner edge portion Ab of the tooth portion forming region A is formed as a circle centering about a position offset from the first axis X1.

In particular, in this face gear G1 too, each one of the plurality of tooth portions 5, a tooth top (addendum) 5a, a tooth face (tooth flank) 5b and a tooth bottom (dedendum) 5c are formed along the tooth trace curve (helix curve). Further, each tooth top 5a is disposed on a virtual plane oriented perpendicular to the first axis X1. And, there is formed the receded space S which is further receded in the direction along the first axis X1 than the tooth bottom 5c of the tooth portion 5. Further, the portion having the shortest distance in the tooth width direction between the inner edge portion Ab and the outer edge portion Aa is set as the distance Da and the portion having the longest distance is set as the distance Db, respectively.

With the above-described arrangement, even when e.g. a driving target is driven with a driving load which varies in the 360 degree region centering about the first axis X1, the pinion gear G2 (drive gear) may be meshed with an area having a larger tooth width at a rotational angle where a large load is applied and the pinion gear G2 may be meshed with an area having a smaller tooth width at a rotational angle where a small load is applied. With setting of the meshing relationship, even if the load varies during one rotation of the driving target, frictional loss can be suppressed and the meshing resistance can be lessened.

With the face gear G1 shown in this further embodiment (e) too, relative to the bottom face forming the receded space S in the gear body 1, protrusion amounts of the plurality of tooth portions 5 (heights from their tooth tops 5a to their tooth bottoms 5c) formed in the tooth portion forming region A are set equal to each other. Further, with this face gear G1 too, the relationship between the rotational angle about the first axis X1 and the tooth width is set to a constant ratio.

In this further embodiment (e), the face gear G1 can be configured e.g. such that the inner edge portion Ab of the tooth portion forming region A is formed as a circle centering about the first axis X1 and the outer edge portion Aa of the tooth portion forming region A is formed as a circle along a circumference centering about a position offset from the first axis X1. Further, the outer edge portion Aa and the inner edge portion Ab need not be formed as circles, but can be formed as ovals, various combined shapes of a circle and a quadratic curve, for instance.

INDUSTRIAL APPLICABILITY

The present invention is applicable to a gear transmission device in which an output-side gear is rotated within an angular range less than 360 degrees relative to rotation of an input-side gear.

REFERENCE SIGNS LIST

1: gear body
5: tooth portion
A: tooth portion forming region
G1: driven gear (face gear)
G2: drive gear (pinion gear)
X1: axis (first axis)

The invention claimed is:
1. A gear transmission device comprising:
a drive gear; and
a driven gear meshing with the drive gear and rotatable for an angular range less than 360 degrees, the driven gear including a plurality of tooth portions having tooth widths set different from each other,
wherein the plurality of tooth portions of the driven gear protruding in a direction along an axis of the driven gear, with protrusion amounts of the plurality of tooth portions of the driven gear being set equal to each other,
wherein an outer end portion of opposed ends in a tooth trace direction of each tooth portion of the driven gear is formed along a circumference centering about the axis of the driven gear, and
wherein an inner end portion of the opposed ends in the tooth trace direction of each tooth portion of the driven gear is formed along a curve centering about an axis other than the axis of the driven gear.

2. The gear transmission device of claim 1, wherein the tooth widths of the tooth portions formed in the driven gear increase in direct proportion to the rotational angle of this the driven gear.

3. The gear transmission device of claim 1, wherein the drive gear is a pinion gear and the driven gear is a face gear.

4. The gear transmission device of claim 1, wherein the axis other than the axis of the driven gear is offset from the axis of the driven gear by a predetermined distance.

5. A gear transmission device comprising:
a drive gear; and
a driven gear meshing with the drive gear and rotatable for an angular range of 360 degrees, the driven gear including a plurality of tooth portions having tooth widths set different from each other,
wherein an outer end portion of opposed ends in a tooth trace direction of each tooth portion of the driven gear is formed along a circumference centering about an axis of the driven gear, and
wherein an inner end portion of the opposed ends in the tooth trace direction of each tooth portion of the driven gear is formed along a curve centering about an axis other than the axis of the driven gear.

* * * * *